United States Patent
Li et al.

(10) Patent No.: US 10,138,959 B2
(45) Date of Patent: Nov. 27, 2018

(54) HYDRAULIC DAMPER

(71) Applicants: Tianwei Li, Shenzhen (CN); Hangyue Li, Shenzhen (CN)

(72) Inventors: Tianwei Li, Shenzhen (CN); Hangyue Li, Shenzhen (CN)

( * ) Notice: Subject to any disclaimer, the term of this patent is extended or adjusted under 35 U.S.C. 154(b) by 14 days.

(21) Appl. No.: 15/103,752

(22) PCT Filed: Sep. 16, 2014

(86) PCT No.: PCT/CN2014/086649
§ 371 (c)(1),
(2) Date: Jun. 10, 2016

(87) PCT Pub. No.: WO2015/158104
PCT Pub. Date: Oct. 22, 2015

(65) Prior Publication Data
US 2016/0327103 A1    Nov. 10, 2016

(30) Foreign Application Priority Data
Apr. 16, 2014 (CN) .......................... 2014 1 0153074

(51) Int. Cl.
*F16D 57/04* (2006.01)
*B60T 10/02* (2006.01)

(52) U.S. Cl.
CPC .............. *F16D 57/04* (2013.01); *B60T 10/02* (2013.01)

(58) Field of Classification Search
CPC ........... F16D 57/02; F16D 57/04; B60T 1/087
See application file for complete search history.

(56) References Cited

U.S. PATENT DOCUMENTS 2,287,130 A * 6/1942 Ramey ............... F16D 57/04
188/264 E
3,476,218 A * 11/1969 Brosig ............... F16D 57/04
188/296
(Continued)

FOREIGN PATENT DOCUMENTS

CN 203130856 8/2013
CN 103335035 10/2013
(Continued)

OTHER PUBLICATIONS

International Search Report for PCT/CN2014/086649 dated Jan. 9, 2015.
Written Opinion for PCT/CN2014/086649 dated Jan. 9, 2015.

*Primary Examiner* — Bradley T King
(74) *Attorney, Agent, or Firm* — Ladas & Parry, LLP

(57) ABSTRACT

Disclosed is a hydraulic damper comprising a rotor (1), a stator (2) and a drive shaft (3) for driving the rotor (1), the rotor (1) and the stator (2) being mutually forming a working chamber (4) in which liquid medium is accommodated, wherein the stator (2) is provided in turn with an outlet (21), a nozzle (22), an exhaust channel (23), an ejector channel (24) and an inlet (25); the outlet (21), the exhaust channel (23) and the inlet (25) are communicated with the working chamber (4) respectively; the ejector channel (24) is in communication with the outlet (21), the exhaust channel (23) and the inlet (25) respectively; the nozzle (22) is arranged at the junction where the outlet (21) is connected with the exhaust channel (23) and the ejector channel (24); the nozzle (22) is extended along the lead-out direction of the outlet (21) to the junction where the exhaust channel (23) is connected with the ejector channel (24), and the channel width of the nozzle (22) at the extension is smaller than that of the outlet (21) and that of the ejector channel (24) respectively. With the Bernoulli's principle, hydraulic (Continued)

damper proposed in the present application can effectively avoid the loss of the liquid medium in the working chamber (4).

5 Claims, 2 Drawing Sheets

(56) References Cited

U.S. PATENT DOCUMENTS

| | | | | |
|---|---|---|---|---|
| 4,773,513 | A | * | 9/1988 | Herrmann ............... B60T 1/087 188/269 |
| 5,771,997 | A | | 6/1998 | Friedrich et al. |
| 2003/0188940 | A1 | * | 10/2003 | Jonsson ................ F16D 57/005 188/296 |
| 2014/0131153 | A1 | * | 5/2014 | Laukemann ............ F16D 57/04 188/274 |
| 2014/0311840 | A1 | * | 10/2014 | Menne .................... B60K 6/12 188/290 |
| 2016/0208869 | A1 | * | 7/2016 | Schlosser ............... F16D 57/04 |

FOREIGN PATENT DOCUMENTS

| | | |
|---|---|---|
| CN | 103967972 | 8/2014 |
| CN | 203836033 | 9/2014 |

\* cited by examiner

HYDRAULIC DAMPER

CROSS-REFERENCE TO RELATED APPLICATIONS

This application is the U.S. National Stage of International Patent Application No. PCT/CN2014/086649 filed on Sep. 16, 2014, which claims the priority to Chinese Patent Application 201410153074.9 filed on Apr. 16, 2014, the disclosures of which are hereby incorporated by reference in their entireties.

TECHNICAL FIELD

The present application relates to a hydraulic damper.

BACKGROUND OF THE INVENTION

Hydraulic damper (also called hydraulic retarder) is an energy-absorbing device converting mechanical energy into heat energy. It is especially employed in automotive auxiliary brake. Two adjacent impellers, i.e. a driven rotor impeller and a fixed stator impeller, are arranged opposite so as to form a working chamber in which a flow loop is formed by liquid medium. The liquid medium is driven by the rotor impeller to rotate around an axis; meanwhile, the liquid medium is moved along the direction of the vanes of the rotor impeller, thrown towards the stator impeller. Due to the reaction force exerted on the liquid medium by the stator impeller, the liquid medium flows out of the stator impeller and turns back to impact the rotor impeller, which forms a resistance torque to the rotor impeller, and hinders the rotation of the rotor impeller, thus achieving a retarding brake on a gear shaft.

When the hydraulic damper works, some liquid medium will be vaporized and converted into gaseous medium with an increased temperature of the liquid medium in the working chamber. If the temperature is high during the operation of the hydraulic damper, especially when the vapor pressure of the employed liquid medium is large, it must manage to discharge the generated gaseous medium, otherwise, the hydraulic damper will be damaged or even exploded due to the excessive pressure in the working chamber.

Since there is no clear dividing line between the liquid medium and the gaseous medium in the working chamber when the hydraulic damper works, in most cases, the liquid medium coexists with the gaseous medium in the working chamber. If the gaseous medium is needed to be discharged out of the working chamber, some liquid medium may inevitably be discharged, which resulted in an excessive loss of the liquid medium in the working chamber.

SUMMARY OF THE INVENTION

Aiming to solve the problem that the liquid medium in the working chamber is ran off when the existed hydraulic damper works, a hydraulic damper is provided in the present application, comprising a rotor, a stator and a drive shaft for driving the rotor, the rotor and the stator being mutually forming a working chamber in which liquid medium is accommodated, wherein the stator is provided in turn with an outlet, a nozzle, an exhaust channel, an ejector channel and an inlet;

the outlet, the exhaust channel and the inlet are communicated with the working chamber respectively;
the ejector channel is in communication with the outlet, the exhaust channel and the inlet respectively;
the nozzle is arranged at the junction where the outlet is connected with the exhaust channel and the ejector channel;
the nozzle is extended along the lead-out direction of the outlet to the junction where the exhaust channel is connected with the ejector channel, and the channel width of the nozzle at the extension is smaller than that of the outlet and that of the ejector channel respectively.

In an embodiment, the angle between the lead-out direction of the outlet and velocity direction of the adjacent liquid medium in the working chamber is less than 90°, the angle between the lead-in direction of the inlet and the velocity direction of the adjacent liquid medium in the working chamber is less than 90°.

In an embodiment, the stator comprises a front stator and a rear stator, the working chamber comprises a front working chamber and a rear working chamber;
  the front stator is arranged at the front side of the rotor, and the front working chamber is formed mutually by the front stator and the front side of the rotor;
  the rear stator is arranged at the rear side of the rotor, and the rear working chamber is formed mutually by the rear stator and the rear side of the rotor.

In an embodiment, the exhaust port of the exhaust channel is in communication with outside air.

In an embodiment, the hydraulic damper further comprises a storage tank for storing the liquid medium; the storage tank is in communication with the working chamber.

In an embodiment, the liquid medium is liquid water

An advantage of the present application is: by providing with the hydraulic damper which is equipped in turn with an outlet, a nozzle, an exhaust channel, an ejector channel and an inlet at the stator thereof, during the operation of the hydraulic damper, the liquid medium in the working chamber is led out of the outlet and entered into the ejector channel via the nozzle, because the channel width of the nozzle at the extension is smaller than that of the outlet and that of the ejector channel respectively, the liquid medium is in a high speed when passed through the nozzle, according to Bernoulli's principle, since the dynamic pressure of high-speed liquid medium increases and the static pressure decreases at the proximity to the junction of the exhaust channel and the ejector channel, there exists adsorption, so that the small amount of liquid medium discharged from the exhaust channel can be absorbed and returned to the working chamber via the ejector channel and the inlet, thus avoiding the loss of the liquid medium in the working chamber.

DETAILED DESCRIPTION

The present invention will be described in further details with following specific embodiments in conjunction with the accompanying drawings.

The present application involves the Bernoulli's principle which was first proposed by Daniel Bernoulli in 1726. The content of the principle is: if the velocity of flowing liquid or gas is small, the local static pressure is high; if the velocity is large, the local static pressure is low.

Figure 1:
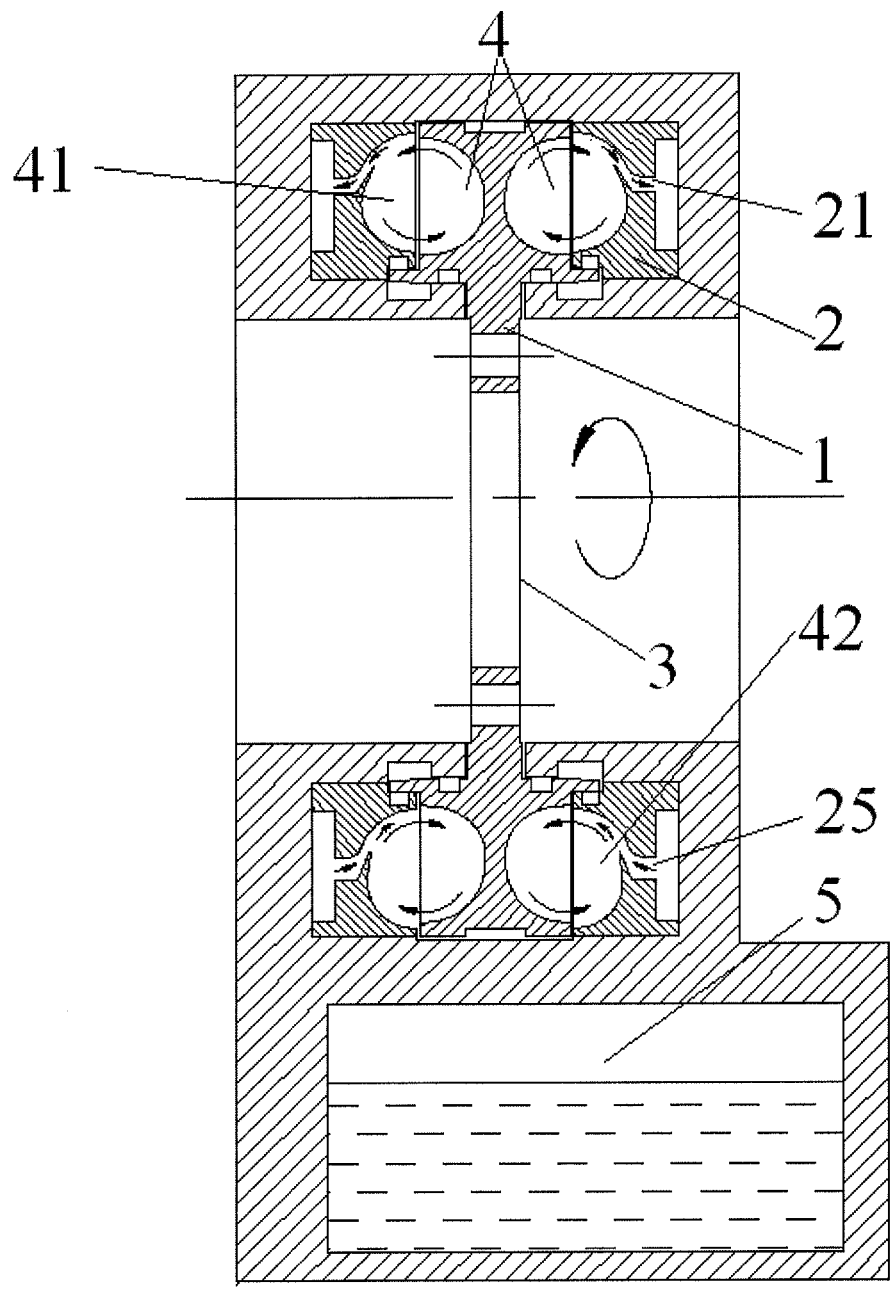
FIG. 1 is a schematic structural view of the hydraulic damper according to an embodiment of the present application.

As shown in FIG. 1, the hydraulic damper provided in this embodiment comprises a rotor 1, a stator 2 and a drive shaft 3. The drive shaft 3 drives the rotor 1. The rotor 1 and the stator 2, provided with a certain space therebetween, mutually form a working chamber 4 in which liquid medium is accommodated when the hydraulic damper works.

The rotor 1 and the stator 2 are respectively provided with vanes which are designed in accordance with hydrodynamics. To fill the working chamber 4 with liquid medium, the hydraulic damper provided in this embodiment further comprises a storage tank 5. The storage tank 5, communicated with the working chamber 4, is loaded with a large amount of liquid medium which is entered into the working chamber 4 via a pipe as needed. When the hydraulic damper works, the liquid medium in the working chamber 4 is absorbed and accelerated by the vane of the rotor 1, and finally impacted towards the stator 2 from the side where the radius of the working chamber 4 is relatively larger; the velocity of the liquid medium is greatly reduced or even reverse through the vane of the stator 2, then the liquid medium is sent back to the rotor 1 by the stator 2 at the side where the radius of the working chamber 4 is relatively smaller; and so forth, during such process, the rotor 1 constantly transmits its own kinetic energy to the liquid medium which in turn converts the kinetic energy into heat through the great pressure received when the stator 2 makes a sharp change of direction (including the direction change inside the rotor), thus achieving dissipation of the kinetic energy of the rotor in the form of heat as well as the damping action of the rotor 1.

In the hydraulic damper provided in this embodiment, the liquid medium in the working chamber 4 is liquid water; while in other embodiments, the liquid medium in the working chamber 4 may be other liquid substances instead of liquid water.

Figure 2:
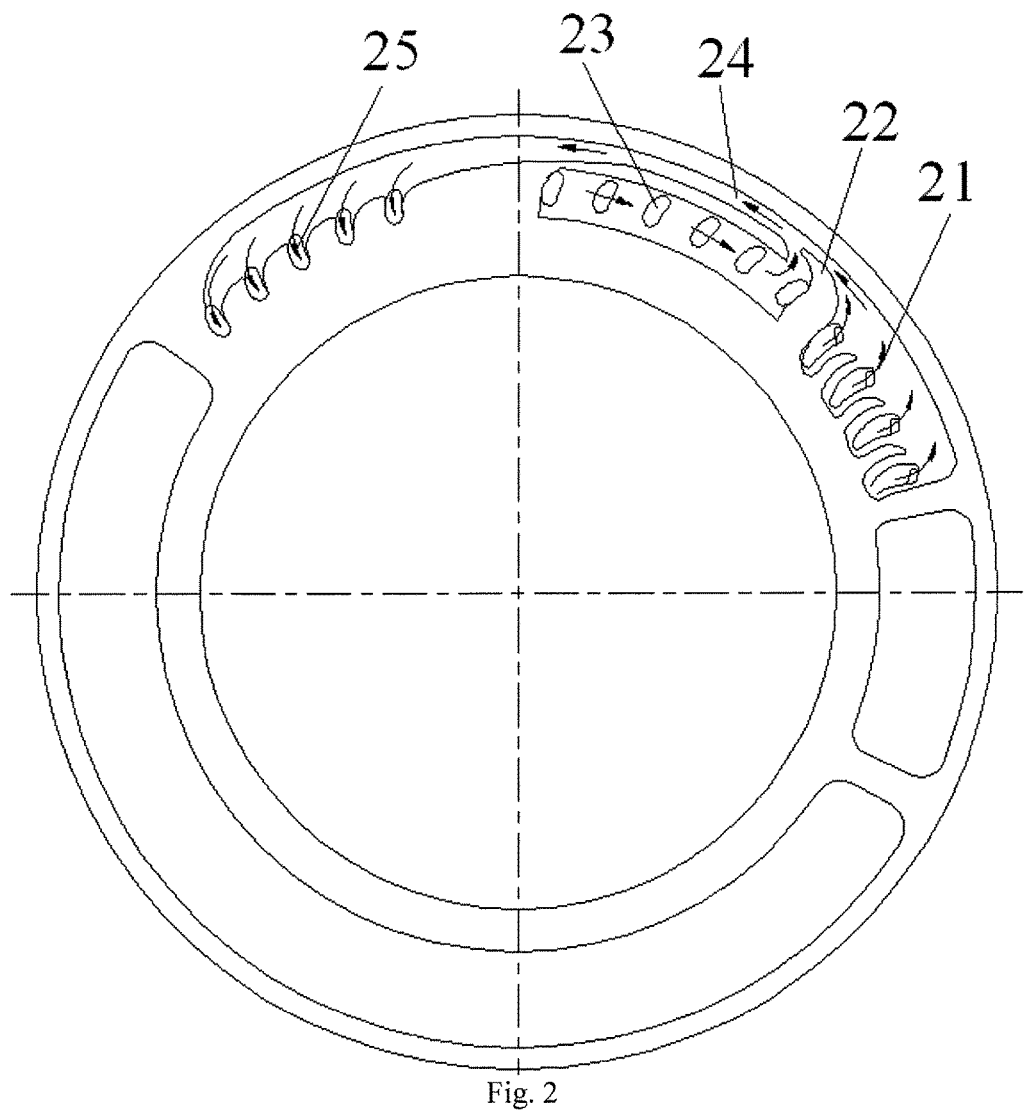
FIG. 2 is a schematic structural view of the stator according to an embodiment of the present application.

During the operation of the hydraulic damper provided in this embodiment, the kinetic energy of the rotor 1 is converted by liquid water into heat, and due to high temperature, the liquid water will be changed into water vapor which is needed to be discharged from the working chamber 4. When the water vapor is discharged, part of the liquid water will also be discharged. In order to reduce the loss of the liquid water in the working chamber 4, the stator 2 of the hydraulic damper has mainly been improved in this embodiment. As shown in FIG. 2, the stator 2 is provided in turn with an outlet 21, a nozzle 22, an exhaust channel 23, an ejector channel 24 and an inlet 25; the outlet 21, the exhaust channel 23 and the inlet 25 are communicated with the working chamber 4 respectively; the ejector channel 24 is in communication with the outlet 21, the exhaust channel 23 and the inlet 25 respectively; the nozzle 22 is arranged at the junction where the outlet 21 is connected with the exhaust channel 23 and the ejector channel 24; the nozzle 22 is extended along the lead-out direction of the outlet 21 to the junction where the exhaust channel 23 is connected with the ejector channel 24, and the channel width of the nozzle 22 at the extension is smaller than that of the outlet 21 and that of the ejector channel 24 respectively.

With the special structure of the stator 2 of the hydraulic damper provided in this embodiment, the liquid medium discharged from the exhaust channel 23 can be effectively recycled to prevent loss of the liquid medium in the working chamber 4. A kind of special ways that the liquid medium discharged from the exhaust channel 23 is recycled by the stator 2 is: when the hydraulic damper works, the liquid medium in the working chamber 4 is led out of the outlet 21 of the stator 2 and entered into the ejector channel 24 via the nozzle 22, because the channel width of the nozzle 22 at the extension is smaller than that of the outlet 21 and that of the ejector channel 24 respectively, the liquid medium is in a high speed when passed through the nozzle 22, according to the Bernoulli's principle, since the dynamic pressure of high-speed liquid medium increases and the static pressure decreases at the proximity to the junction of the exhaust channel 23 and the ejector channel 24, there exists adsorption, so that the small amount of liquid medium discharged from the exhaust channel 23 can be absorbed and returned to the working chamber 4 via the ejector channel 24 and the inlet 25, thus avoiding the loss of the liquid medium in the working chamber 4.

In this embodiment, since the liquid medium in the working chamber 4 is drawn through the outlet 21 and the liquid medium in the ejector channel 24 is returned to the working chamber 4 through the inlet 25, the angle between the lead-out direction of the outlet 21 and velocity direction of the adjacent liquid medium in the working chamber 4 is less than 90°, and the angle between the lead-in direction of the inlet 25 and the velocity direction of the adjacent liquid medium in the working chamber 4 is less than 90°. Specially, the outlet 21 is designed to be able to lead out the energy of the liquid medium in the working chamber 4 as much as possible, the inlet 25 is designed to be able to minimize the energy of the liquid medium required to return to the working chamber 4. In this embodiment, there is a plurality of outlet 21 and a plurality of inlet 25; the exhaust channel 23, used for discharging the air in the working chamber 4 to the outside, is provided with a plurality of exhaust ports, apparently, the exhaust port of the exhaust channel 23 is in communication with outside air.

In this embodiment, the working chamber 4 of the hydraulic damper comprises a front working chamber 41 and a rear working chamber 42, in particular, the stator 2 in this embodiment comprises a front stator and a rear stator, the front stator is arranged at the front side of the rotor 1, the rear stator is arranged at the rear side of the rotor 1, the front working chamber 41 is formed mutually by the front stator and the front side of the rotor 1, and the rear working chamber 42 is formed mutually by the rear stator and the rear side of the rotor 1. Through the joint action on the rotor 1 made by the front stator and the rear stator, the damping effort of the rotor 1 can be effectively improved, which further enhances the damping effort of the hydraulic damper. According to actual needs, only the front working chamber 41 or the rear working chamber 42 is provided in the hydraulic damper in other embodiments.

What is described above is a further detailed explanation of the present invention in combination with specific embodiments; however, it cannot be considered that the specific embodiments of the present invention are only limited to the explanation. For those of ordinary skill in the art, some simple deductions or replacements can also be made under the premise of the concept of the present invention.

What is claimed is:

1. An hydraulic damper, comprising a rotor, a stator and a drive shaft for driving the rotor, the rotor and the stator mutually forming a working chamber in which liquid medium is accommodated, wherein, at a radial edge of the stator and along a direction of movement of the liquid medium, the stator is provided with an outlet, a nozzle, an exhaust channel, an ejector channel and an inlet;

the outlet, the exhaust channel and the inlet communicate with the working chamber respectively;

the ejector channel is provided outside of the exhaust channel and is in communication with the outlet, the exhaust channel and the inlet respectively;

the nozzle is arranged at a junction where the outlet is connected with the exhaust channel and the ejector channel;

the nozzle extends along a lead-out direction of the outlet to the junction where the exhaust channel is connected with the ejector channel, and a channel width of the nozzle at tip of the nozzle is smaller than that of the outlet and that of the ejector channel respectively.

2. The hydraulic damper according to claim 1, wherein an angle between a lead-out direction of the outlet and moving direction of the liquid medium in the working chamber is less than 90°, an angle between a lead-in direction of the inlet and the moving direction of the liquid medium in the working chamber is less than 90°.

3. The hydraulic damper according to claim 2, wherein the stator comprises a front stator and a rear stator, the working chamber comprises a front working chamber and a rear working chamber;

the front stator is arranged at a front side of the rotor, and the front working chamber is formed mutually by the front stator and the front side of the rotor;

the rear stator is arranged at a rear side of the rotor, and the rear working chamber is formed mutually by the rear stator and the rear side of the rotor.

4. The hydraulic damper according to claim 1, further comprising a storage tank for storing the liquid medium;

the storage tank is in communication with the working chamber.

5. The hydraulic damper according to claim 1, wherein the liquid medium is liquid water.

* * * * *